(12) United States Patent
Frohlich et al.

(10) Patent No.: US 7,140,782 B2
(45) Date of Patent: Nov. 28, 2006

(54) PATCH CABLE MANAGEMENT SYSTEM

(75) Inventors: Franz-Friedrich Frohlich, Hagen (DE); Oliver Lapp, Wuppertal (DE)

(73) Assignee: CCS Technology Inc., Wilmington, DE (US)

( * ) Notice: Subject to any disclaimer, the term of this patent is extended or adjusted under 35 U.S.C. 154(b) by 0 days.

(21) Appl. No.: 10/498,585

(22) PCT Filed: Nov. 22, 2002

(86) PCT No.: PCT/EP02/13112

§ 371 (c)(1), (2), (4) Date: Mar. 31, 2005

(87) PCT Pub. No.: WO03/050582

PCT Pub. Date: Jun. 19, 2003

(65) Prior Publication Data

US 2005/0169595 A1    Aug. 4, 2005

(30) Foreign Application Priority Data

Dec. 13, 2001 (DE) ............................ 202 20 192 U

(51) Int. Cl.
G02B 3/36 (2006.01)
(52) U.S. Cl. ........................................................ 385/53
(58) Field of Classification Search .............. 385/53–94
See application file for complete search history.

(56) References Cited

U.S. PATENT DOCUMENTS 5,204,925 A    4/1993 Bonanni et al. ............... 385/89
5,337,400 A    8/1994 Morin et al. ................. 385/135
5,353,367 A    10/1994 Czosnowski et al. ........ 385/135
5,448,675 A    9/1995 Leone et al. ................. 385/135
5,463,736 A    10/1995 Elko et al. ................... 395/848
5,509,066 A    4/1996 Saligny ....................... 379/327
5,764,043 A    6/1998 Czosnowski et al. ......... 324/66
5,960,130 A    9/1999 Pimpinella .................... 385/15

FOREIGN PATENT DOCUMENTS

| DE | 3206868 A1 | 9/1983 |
| DE | 3206868 C2 | 5/1990 |
| DE | 4306349 C1 | 3/1994 |
| DE | 4301421 A1 | 7/1994 |
| EP | 0364658 A2 | 4/1989 |
| EP | 0649204 B1 | 3/1997 |
| EP | 0830036 A2 | 9/1997 |
| EP | 0830038 A2 | 9/1997 |
| WO | WO00/05611 | 2/2000 |

Primary Examiner—Sung Pak
Assistant Examiner—Tina M. Wong
(74) Attorney, Agent, or Firm—Keith A. Roberson

(57) ABSTRACT

A patch cable management system for an optical waveguide distributing device includes a plurality of plus modules and/or splice modules mounted on a subrack. Each plus module and/or splice module is provided with a plurality of couplings for contact with optical waveguides on the front and rear. An electronic module provided with all the functions and componenty of a conventional backplane can be positioned at any desired location within the optical waveguide distributing device and connected to the plug moduels and/or splice modules to serve for the electronic addressing and localization of the plugged optical-fiber connections.

5 Claims, 5 Drawing Sheets

PATCH CABLE MANAGEMENT SYSTEM

CROSS REFERENCE TO RELATED APPLICATION

This application is a National application claiming priority to International Application No. PCT/EP2002/013112, filed on Nov. 22, 2002, which claims priority to Germany Patent Application No. 20120192.5, filed on Dec. 13, 2001.

FIELD OF THE INVENTION

The invention relates to a patch cable management system for an optical waveguide distributing device.

BACKGROUND OF THE INVENTION

When setting up optical-fiber cable networks, distribution devices such as for example distribution cabinets or distribution frames are required to ensure structured cabling. Generally a number of subracks are arranged within such optical waveguide distributing devices, each subrack preferably receiving up to twelve plug modules and/or splice modules.

A patch cable management system with electronic localization of the plugged optical-fiber connections, that is electronic patch cable localization, is known. In the case of this known system, the plug modules and/or the splice modules are pushed into the subrack—also known as a module rack. On the rear side of the subrack there is a rear wall—known as a backplane—which supplies power and connects the data lines to the plug modules and/or splice modules. In addition, hard wiring serves for the electronic addressing of the inserted plug modules. The use of such a rigid rear wall is disadvantageous, since it has to be made to match the type of construction of the subrack with regard to its dimensions and other properties, and the flexibility of the patch cable management system is restricted as a result.

Against this background, the present invention is based on the problem of providing a novel patch cable management system for an optical waveguide distributing device.

The fact that the rigid back wall is omitted means that the patch cable management system according to the invention is distinguished by great flexibility. Also, retrofitting of existing patch cable management systems can take place in a simple way.

BRIEF DESCRIPTION OF THE DRAWINGS

Preferred developments of the invention emerge from the description which follows. Exemplary embodiments are explained in more detail on the basis of the drawing[s], in which.

DETAILED DESCRIPTION OF THE INVENTION

Figure 1:
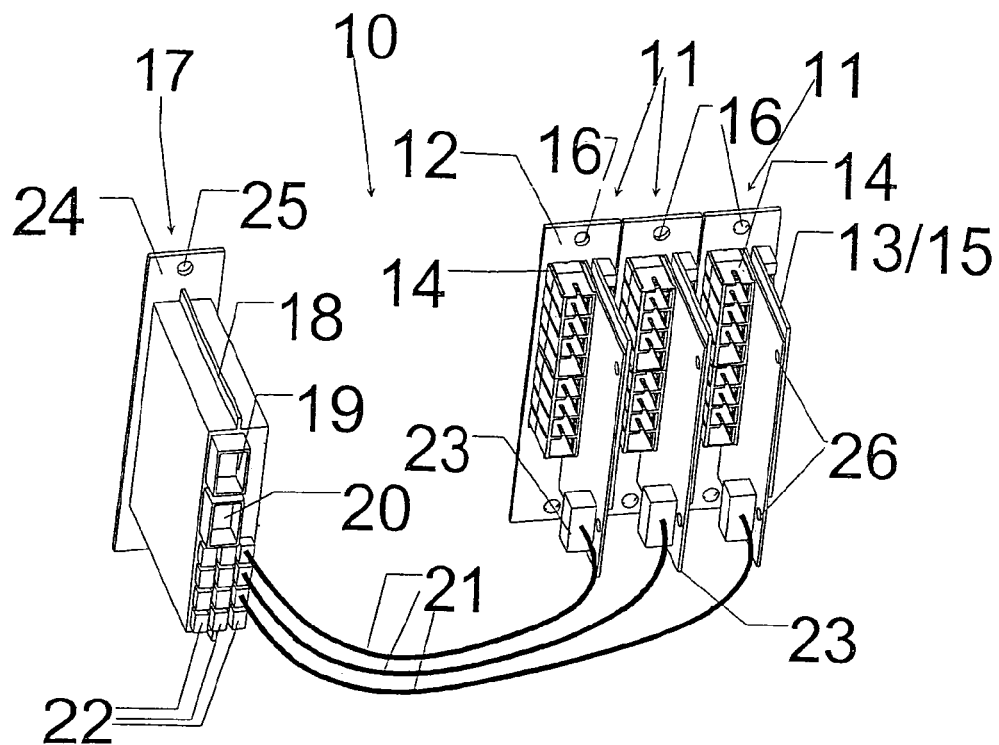
FIG. 1 shows a patch cable management system according to the invention for an optical waveguide distributing device, namely an optical waveguide distributing cabinet, in a perspective rear view on the basis of a first exemplary embodiment of the invention.
Figure 2:
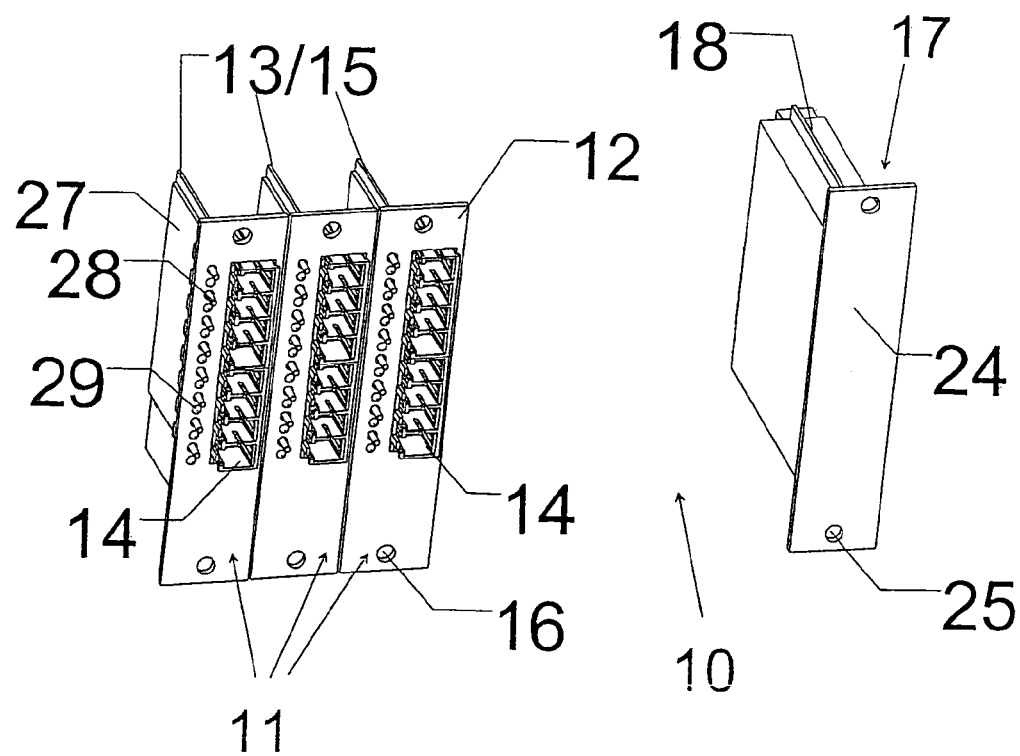
FIG. 2 shows the patch cable management system according to the invention of FIG. 1 in a perspective front view.

FIGS. 1 and 2 show a patch cable management system according to the invention on the basis of a first exemplary embodiment of the invention, FIG. 1 showing the same in a perspective rear view and FIG. 2 showing the same in a perspective front view. FIGS. 1 and 2 show altogether three plug modules 11, which have been pushed into a subrack (not represented any further). The plug modules 11 have a front plate 12 and a supporting plate 13, which is orthogonal to the front plate 12. As FIG. 1 reveals in particular, a number of couplings 14 for optical waveguides are arranged on one side of the supporting plate 13 of the plug modules 11. In the exemplary embodiment shown, eight couplings 14 are provided for each plug module. More than eight couplings 14 per plug module may also be provided, as shown in the exemplary embodiment of FIG. 8.

The couplings 14 extend through the front plate 12 of the plug modules 11, so that optical waveguides can be led from the front side of the front plate 12 up to the plug module 11 and inserted into the couplings 14, while a contact with another optical waveguide can be established on the rear side. Edges 15 of the supporting plate 13 are formed in such a way that the plug modules 11 can be pushed into guiding systems of a subrack. The plug modules 11 may additionally also be fastened by means of bores 16 made in the front plate 12 to a frame (not represented) of the subrack (not represented).

According to the invention, an electronic module 17 is provided and can be positioned as desired inside the optical waveguide distributing cabinet for the patch cable management system 10. A configuration of the electronic module 17 in which the electronic module 17 can be pushed together with the plug modules 11 into the respective subrack is preferred. If the subrack has a guiding system, edges 18 of the electronic module 17 are adapted to the guiding system. In other words, the edges 18 of the electronic module 17 then correspond to the edges 15 of the plug modules 11. The plug modules 11 and/or splice modules and the electronic module 17 can be positioned at any desired locations and in any desired sequence or arrangement in the subrack.

Integrated in the electronic module 17 are all the functions or components that in prior-art systems are integrated on the rigid rear wall—known as the backplane. For instance, the electronic module 17 has a plug-in connector 19 for the connection of a power supply and a plug-in connector 20 for the connection of a data bus. Furthermore, as set out in still greater detail further below, the electronic module 17 also serves for the electronic addressing of the patch cables or the plugged optical-fiber connections.

In the case of the exemplary embodiment of FIGS. 1 and 2, the plug modules 11 can be connected to the electronic module 17 by means of flexible connecting cables 21. For reasons of overall clarity, the connecting cables 21 are not shown in FIG. 2. Each end of a connecting cable 21 is respectively assigned a plug-in connector 22 or 23, which can be connected either to the plug module 11 or to the electronic module 17. If, to reduce costs, the plug-in connectors 22 or 23 are to be omitted, it is also conceivable to attach the connecting cables 21 permanently to either the plug modules 11 or to the electronic module 17 and in this way dispense with the need for the respective plug-in connector.

As FIG. 1 reveals, the electronic module 17 has altogether twelve plug-in connectors 22 for the connection of altogether twelve plug modules 11 or splice modules. Twelve is given as the number of plug-in connectors on the basis of the currently customary arrangement of conventional systems. The number of plug-in connectors, and consequently the number of plug modules and/or splice modules that can be assigned to an electronic module, may lie between one and the number required for fully utilizing the distributing cabinet. For reasons of overall clarity, however, it should be endeavored to keep to a maximum of sixteen plug-in connectors per electronic module. However, a number of such electronic modules with sixteen plug-in connectors may be used, until the distributing cabinet or rack is fully utilized.

If the electronic module 17 is pushed together with the plug modules 11 into a subrack (not represented any further), not only the edges 15 and 18 of the plug modules 11 and the electronic module 17, respectively, coincide, but rather the electronic module 17 then also has a front plate 24 with dimensions similar to those of the front plates 12 of the plug modules 11. The front plate 24 of the electronic module 17 may in turn also be assigned bores 25 in order to fasten the electronic module 17 to a frame of the subrack in a way similar to the plug modules 11.

FIG. 1 reveals that not only the front plate 12 of the plug modules 11 has bores 16, but rather that the supporting plate 13 of the plug modules 11 also has bores 26. As a result, for example, splice organizers or strain-relieving devices for optical-fiber cables to be led away can be fastened to the supporting plates 13 of the plug modules 11.

As FIG. 2 reveals in particular, arranged on the side of the supporting plate 13 that is opposite from the couplings 14 is a printed circuit board 27, which is in connection with interrogation sensors 28 and corresponding indicator lights 29, which are formed as LEDs. The fact that the printed circuit board 27, which serves for the electronic addressing and localization of plugged optical-fiber connections, is arranged on the opposite side of the supporting plate 13 than are the couplings 14 means that a spatial separation of the printed circuit board 27 from the couplings 14 and the optical waveguides to be handled is achieved. This makes it possible to exchange a printed circuit board 27 without having to interrupt optical-fiber connections established by means of the couplings 14.

The connecting cables 21 may be routed in any way desired from the plug modules 11 to the electronic module 17. The length and cabling path of the connecting cables 21 are freely variable, whereby the flexibility of the patch cable management system is increased. The sequence in which the plug modules 11 and the electronic module 12 are pushed into a subrack is accordingly freely selectable. In this way, even not yet fully loaded subracks can be retrofitted with the patch cable management system according to the invention in a simple way.

Power supply lines, address lines and data lines are integrated in each of the connecting cables 21. The supply of electrical energy to the plug modules 11 accordingly takes place via the power supply lines of the connecting cables 21 and consequently via the electronic module 17. By means of the data lines of the connecting cables 21, the plug modules 11 can be connected to a data bus via the electronic module 17. The address lines of the connecting cables 21 ensure the electronic addressing and localization of the plugged optical-fiber connections. It is accordingly in keeping with the invention to relocate all the functions which are undertaken in prior-art patch cable management systems by the so-called backplane to a separate module, namely the electronic module 17. This can then be handled like the plug modules 11.

Figure 3:
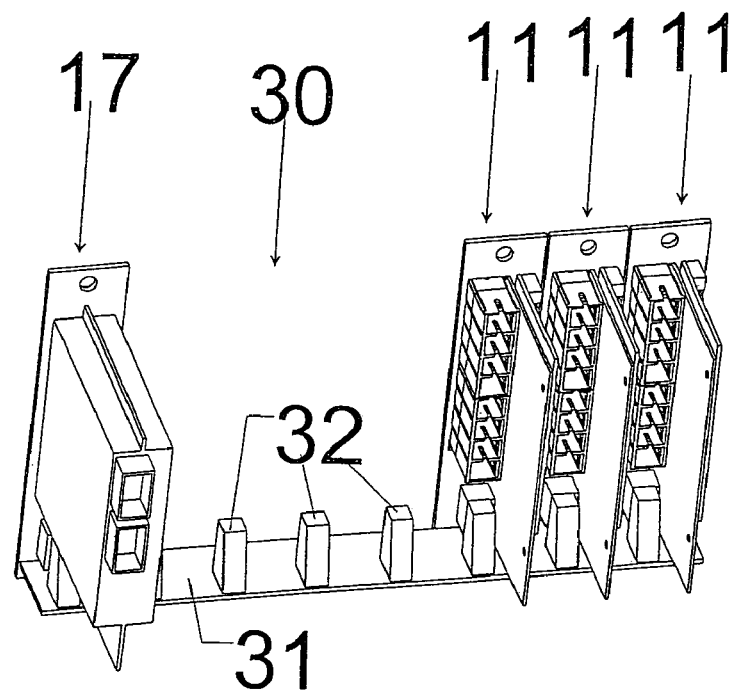
FIG. 3 shows a patch cable management system according to the invention for an optical waveguide distributing cabinet in a perspective rear view on the basis of a second exemplary embodiment of the invention.
Figure 4:
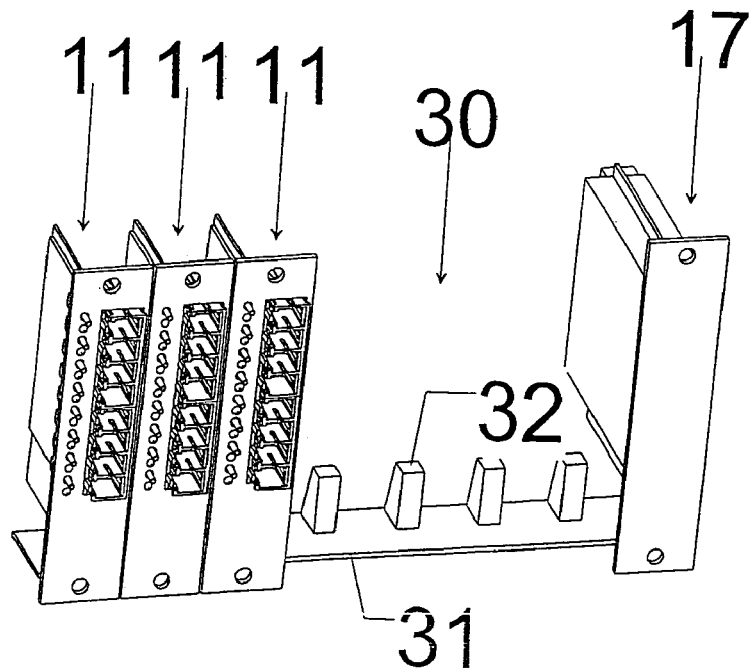
FIG. 4 shows the patch cable management system according to the invention of FIG. 3 in a perspective front view.

FIGS. 3 and 4 show a patch cable management system 30 on the basis of a second exemplary embodiment of the invention. The exemplary embodiment of FIGS. 3 and 4 differs from the exemplary embodiment of FIGS. 1 and 2 merely by the connection of the plug modules 11 to the electronic module 17. To avoid repetition, the same reference numerals are therefore used for the same subassemblies. As FIGS. 3 and 4 reveal, in the case of this exemplary embodiment the connection of the plug modules 11 to the electronic module 17 does not take place via flexible connecting lines, but via a multipoint connector 31. The multipoint connector 31 consequently carries a number of plug-in connectors 32. According to FIG. 3, the plug-in connectors 32 engage from the rear side in the plug modules 11 and the electronic module 17. This configuration is advantageous in particular if a clear sequence of the modules 11, 17 is desired.

Figure 5:
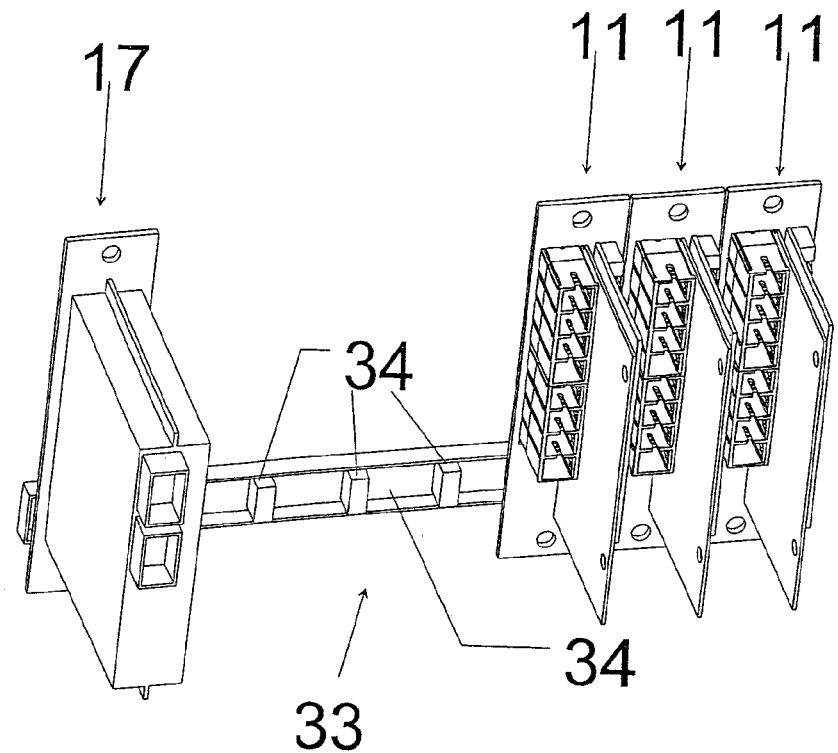
FIG. 5 shows a patch cable management system according to the invention for an optical waveguide distributing cabinet in a perspective rear view on the basis of a third exemplary embodiment of the invention.
Figure 6:
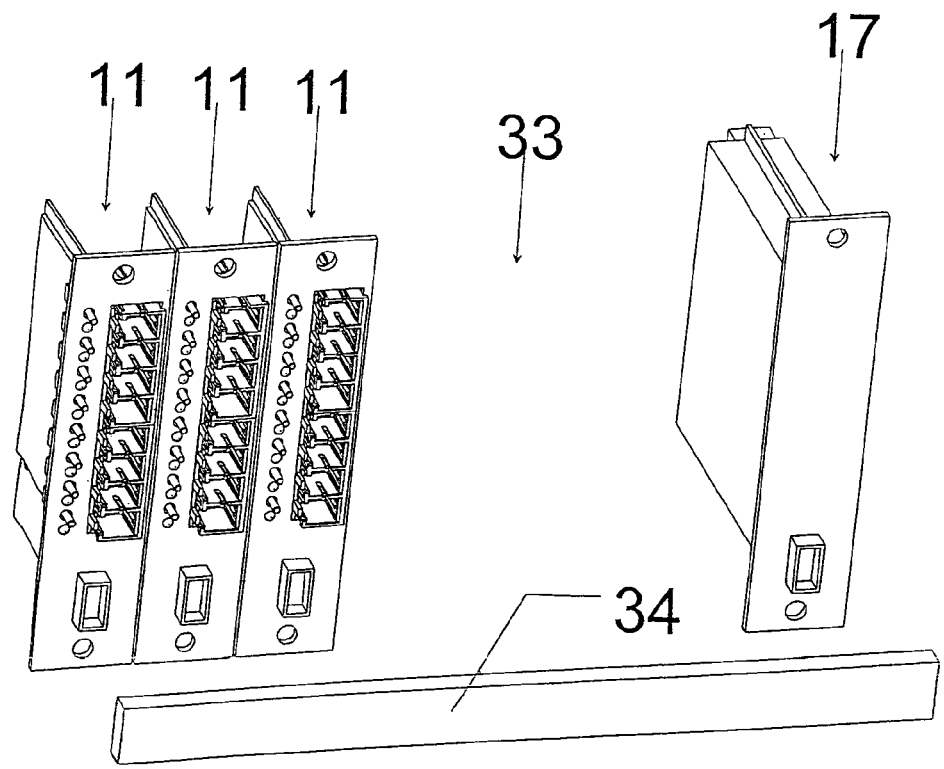
FIG. 6 shows the patch cable management system according to the invention of FIG. 5 in a perspective front view.

The exemplary embodiment according to FIGS. 5 and 6 shows a further possibility for the connection of the plug modules 11 to the electronic module 17. Also in the case of the patch cable management system 33 according to the invention that is shown there, a number of plug modules 11 are connected to the electronic module 17 via a multipoint connector 34. As a difference from the exemplary embodiment of FIGS. 3 and 4, however, the plug-in connectors 35 of the multipoint connector 34 engage in the modules 11, 17 from the front side.

Figure 8:
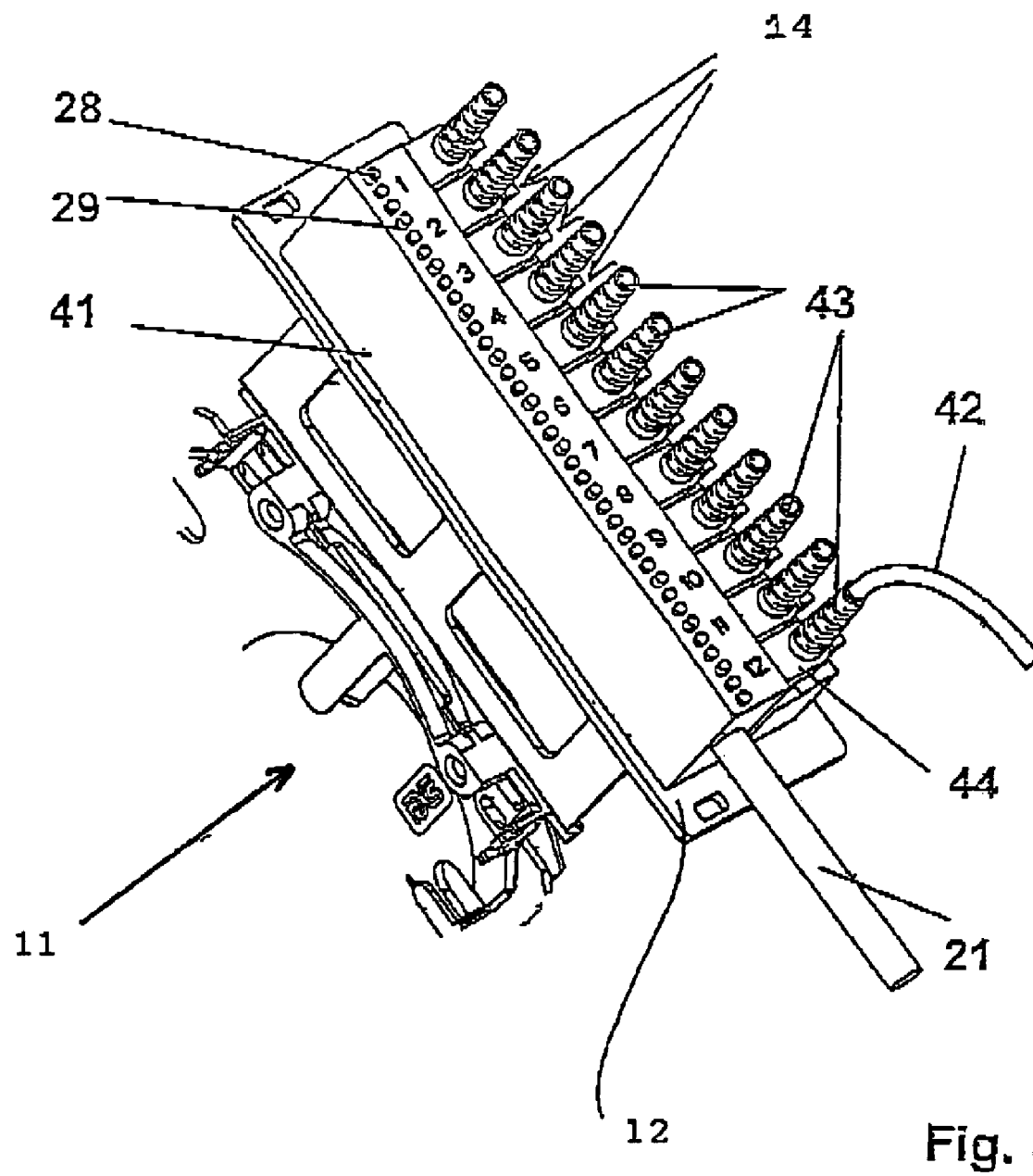
FIG. 8 shows a patch cable management system according to the invention for an optical waveguide distributing cabinet in a perspective front view on the basis of a fourth exemplary embodiment of the invention.

A further exemplary embodiment is shown by FIG. 8. Thus, FIG. 8 shows a plug module 11 with altogether twelve couplings 14 for optical waveguides or patch cables. FIG. 8 shows patch cables 42 which are inserted by means of corresponding plugs 43 into the couplings 14 of the plug module 11. For reasons of better overall clarity, only one patch cable 42 is shown.

The main difference between the exemplary embodiment of FIG. 8 and the exemplary embodiments of FIGS. 1 to 6 is not the number of couplings 14 but that the printed circuit board 27, which serves for the electronic addressing and localization, is integrated in an electronic block 41, which can be mounted onto the outer side of the front plate 12 of the plug module 11. This electronic block 41 contains the already mentioned electronic printed circuit board 27 and also the interrogation sensors 28 and the indicator lights 29. Each plug module 11 is then connected to an electronic module 17 via the electronic block 41 or via the connecting cable 21 acting on the electronic block. Mounted on each patch cable 42 or the plugs 43 of the same is a chip 44, serving together with the printed circuit board 27 for the electronic localization of the plugged optical-fiber connections. This creates a solution which makes it possible for an existing distribution panel that is in operation to be subsequently upgraded. The connection between the electronic block 41 and the localizing chips 44 is created by electrical contacting (not represented in detail).

As already mentioned several times, all the exemplary embodiments share the common feature that the electronic module 17 serves for the electronic addressing and the printed circuit board 27 of the plug modules 11 or splice modules serve for the electronic addressing and localization of the plugged optical-fiber connections. Electronic addressing is to be understood as meaning that all the couplings 14 of all the plug modules or splice modules can be precisely identified with the aid of a unique address. It must be possible to identify which coupling 14 is assigned to which plug module 11 and which plug module 11 is assigned to which electronic module 17. Furthermore, the electronic localization is important to the extent that plugged connections of optical waveguides (patched connections), for example between two plug modules 11, are uniquely identifiable.

Figure 7:
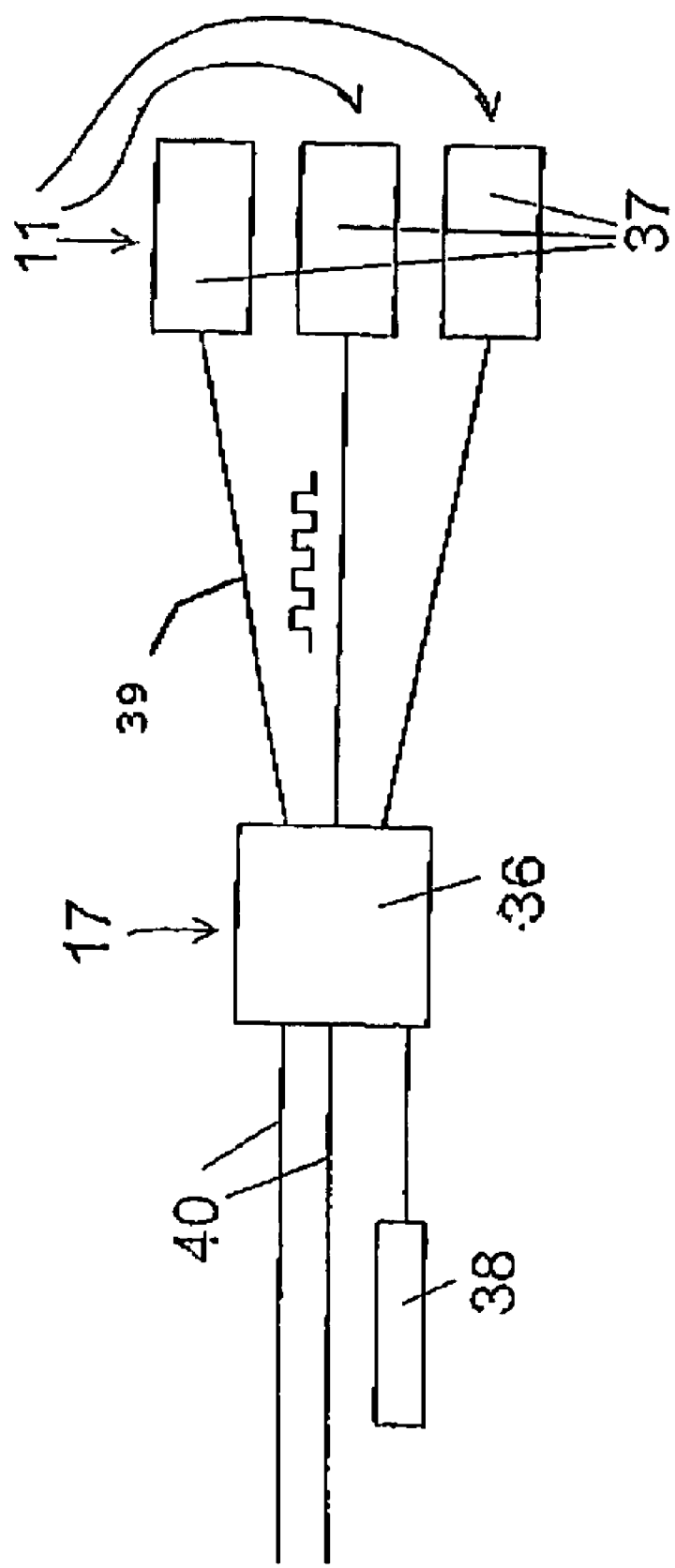
FIG. 7 shows a greatly schematized block diagram to illustrate the mode of operation of the patch cable management system as provided by the invention.

As FIG. 7 shows, a processor 36 is assigned to the electronic module 17. A processor 37 is likewise respectively assigned to the plug modules 11, namely the printed circuit boards 27. Apart from the processor 36, the electronic module 17 has a switch 38, a so-called DIP switch. The processor 36 of the electronic module 17 and the processors 37 of the respective plug modules 11 communicate via address lines 39. The processor 37, which is assigned to each plug module 11 on the printed circuit board 27, forms an address for the couplings 14 of the respective plug module 11. For address formation, also assigned to the electronic module 17 is the processor 36, which sends a bit pattern which corresponds to an address within the subrack to each of its connected plug modules 11 via the address lines 39. In addition, the electronic module 17 has the switch 38, with the aid of which the subracks or the electronic modules 17 in the distribution panel, the optical waveguide distribution cabinet, are allocated a number. This number is also sent to the processor 37 in the plug module 11. The processor 37 in the plug module 11 sends these three components of the address with a status statement concerning the assignment of the couplings 14 to a central computer, whereby ultimately the electronic localization is ensured. The flexibility of the arrangement is so great because the plug modules 11 can be positioned as desired in the optical waveguide distribution cabinet with electronic patch cable localization in exchange for conventional modules. The position is simply entered during the initialization of the plug modules in response to an inquiry by the central computer.

In the exemplary embodiment of FIGS. 1, 2 and 8, the address lines 39 are integrated in the connecting cables 21. In the exemplary embodiment of FIGS. 3 and 4 and of 4 and 5, the address lines 39 run inside the multipoint connectors 31 and 34, respectively. Since each plug module 11 is connected to the electronic module 17 or to the processor 36 of the electronic module 17 via a separate plug connector, each address line 39 can be assigned a unique data packet, which can be read out by the processors 37 of the plug modules and from which a unique address for each plug module 11 can be taken. The communication with the central computer (not represented) then takes place via bus lines 40.

At this point it should be noted that it is also possible to dispense with the switch 38, which allocates a unique number to each electronic module 17. The electronic module 17 is then allocated a unique number from the central computer via the bus lines 40. This has the advantage that the initialization process of the individual modules can be simplified.

List of Reference Numeral Designations 10 patch cable management system
11 plug module
12 front plate
13 supporting plate
14 couplings
15 edge
16 bore
17 electronic module
18 edge
19 plug-in connector
20 plug-in connector
21 connecting cable
22 plug-in connector
23 plug-in connector
24 front plate
25 bore
26 bore
27 printed circuit board
28 interrogation sensor
29 indicator light
30 patch cable management system
31 multipoint connector
32 plug-in connector
33 patch cable management system
34 multipoint connector
35 plug-in connector
36 processor
37 processor
38 switch
39 address line
40 bus line
41 electronic block
42 patch cable
43 plug
44 chip That which is claimed is:

1. A patch cable management system for an optical waveguide distributing device comprising;
   a plurality of subracks;
   each subrack receiving a number of plug modules and an electronic module, the electric module supplying power to the plug modules and performing electronic addressing of the plug modules;
   the plug modules of each subrack being connected to the corresponding electronic module via a multipoint connector;
   each plug module comprising a processor;
   each electronic module comprising a processor and a switch;
   the processor of the electronic module and the processors of the plug modules of each subrack communicating via at least one address line provided within the multipoint connector of each subrack;
   the processor of each plug module providing a first address for each coupling of the respective plug module;
   the processor of the electronic module of each subrack transmitting a bit pattern to the processor of each plug module associated with the respective electronic module, the bit pattern providing a second address for each plug module within the respective subrack;

the switch of the electronic module of each subrack providing a third address for each electronic module within the optical waveguide distributing device, the third address being transmitted to the processor of each plug module of the respective subrack;

the first address, the second address and the third address providing a three part address for each coupling of each plug module, the processor of each plug module transmitting the three part address together with a status statement relating to the respective coupling to a central computer, thereby providing an electronic patch cable localization.

2. The patch cable management system as claimed in claim 1, wherein the electronic module is configured to be inserted together with the plug modules into the respective subrack.

3. The patch cable management system as claimed in claim 1, wherein the electronic module is configured to be connected to the plug modules of the respective subrack via flexible connecting cables.

4. The patch cable management system as claimed in claim 1, wherein each plug module has a printed circuit board with an assigned processor for the electronic patch cable localization.

5. The patch cable management system as claimed in claim 4, wherein the plug module comprises one or more couplings and the printed circuit board is spatially separate from the couplings of the plug module in such a way that the printed circuit board can be exchanged without interrupting plugged optical-fiber connections.

* * * * *